United States Patent [19]

Harris

[11] Patent Number: 4,899,606
[45] Date of Patent: Feb. 13, 1990

[54] APPARATUS FOR ASSEMBLING PARTS AND DISCHARGING ASSEMBLED PARTS

[76] Inventor: Marion K. Harris, P.O. Box 2017, Atascadero, Calif. 93423

[21] Appl. No.: 245,507

[22] Filed: Sep. 19, 1988

[51] Int. Cl.⁴ .............................................. F16H 19/08
[52] U.S. Cl. ........................................ 74/29; 74/31; 74/89.17
[58] Field of Search ..................... 74/23, 29, 31, 89.17

[56] References Cited

U.S. PATENT DOCUMENTS

| | | | |
|---|---|---|---|
| 407,652 | 7/1889 | Fenner | 101/282 |
| 595,732 | 12/1897 | Pitt | 74/29 |
| 3,777,580 | 12/1973 | Brems | 74/29 |
| 3,988,939 | 11/1976 | Stoner | 74/29 |
| 4,023,420 | 5/1977 | Dressler | 74/52 |
| 4,244,233 | 1/1981 | Brems | 74/29 |
| 4,269,076 | 5/1981 | Obra | 74/52 |
| 4,495,828 | 1/1985 | Iwamoto | 74/110 |
| 4,528,860 | 7/1985 | Barr | 74/52 |

FOREIGN PATENT DOCUMENTS

| | | | |
|---|---|---|---|
| 940986 | 12/1948 | France | 74/29 |
| 588726 | 6/1947 | United Kingdom | 74/31 |

Primary Examiner—Leslie A. Braun
Assistant Examiner—Scott Anchell
Attorney, Agent, or Firm—Jack M. Wiseman

[57] ABSTRACT

A multiple-step cyclical ram advancing apparatus. In a three step configuration linear motion is imparted to a moving axis as revolution therearound translates said axis to provide a first linear push to a slide ram to abut articles, then a partial retraction of the slide ram during a period of dwell, followed by a second linear push to discharge the assembled articles. In other configurations, the ram is alternately advanced and retracted a varying number of times depending on the integer ratio of the number of revolutions of the pinion gear in half revolutions to the number of revolutions of the flywheel.

8 Claims, 8 Drawing Sheets

APPARATUS FOR ASSEMBLING PARTS AND DISCHARGING ASSEMBLED PARTS

BACKGROUND AND SUMMARY OF THE INVENTION

The present invention relates to a drive system having a reciprocating ram for both assembling mating parts and discharging the assembled parts into a receptacle. Namely, the present invention relates to a multiple-step cyclical ram-advancing apparatus. In a two, or more, step configuration linear motion is imparted to a moving axis as revolution therearound translates said axis to provide a first linear push to a slide ram to abut articles, thence a partial retraction of the slide ram during a period of dwell. In the three step configuration, the above two steps are followed by a second linear push to discharge the assembled articles. With the addition of steps beyond three to the configuration, the steps of retraction and forward push are alternately added in the operation.

In operation, the three-step configuration causes the ram to travel forward compressing the parts together, then the ram is partially retracted slowly, and then advanced farther forward than in the assembly step to discharge the completed item at the farthest travel of the ram. In other configurations, the ram is alternately advanced and retracted a varying number of times depending on the integer ratio of the number of revolutions of the pinion gear in half revolution steps to one revolution of the system flywheel.

DESCRIPTION OF THE PREFERRED EMBODIMENT

FIGS. 1a-d each show a flywheel 1 revolving at a constant speed and in one sense only (clockwise here) driving a connecting rod 2 which moves a pinion gear 5 along a rack 6 which is anchored to the frame of the machine. The pinion gear 5 has a pitch circle circumference that is $\frac{2}{3}$ the diameter of flywheel 1. Additionally, pinion gear 5 has fastened to its central axis an arm 3 which drives a second connecting rod 4 which drives ram 7 to compress parts 9 and 11 together with those parts backed up by buck 13 during the assembly operation.

For purposes of this initial discussion the lengths of, and the included angles in the various positions of, arm 3 and rods 2 and 4 will be overlooked and their effect will be discussed below in a specific example of the present invention. The greater the ratio of the length of rods 2 and 4 to the diameter of pinion gear 5, the lesser the effect of the lengths and included angles of rods 2 and 4, and arm 3.

Additionally, ram 7 is shown in these figures as being on a platform above the horizontal plane that contains the centers of flywheel 1 and pinion gear 5. The platform on which ram 7 travels can be on any plane and need not be on a raised plane as shown here.

Figures 1A, 1B, 1C:
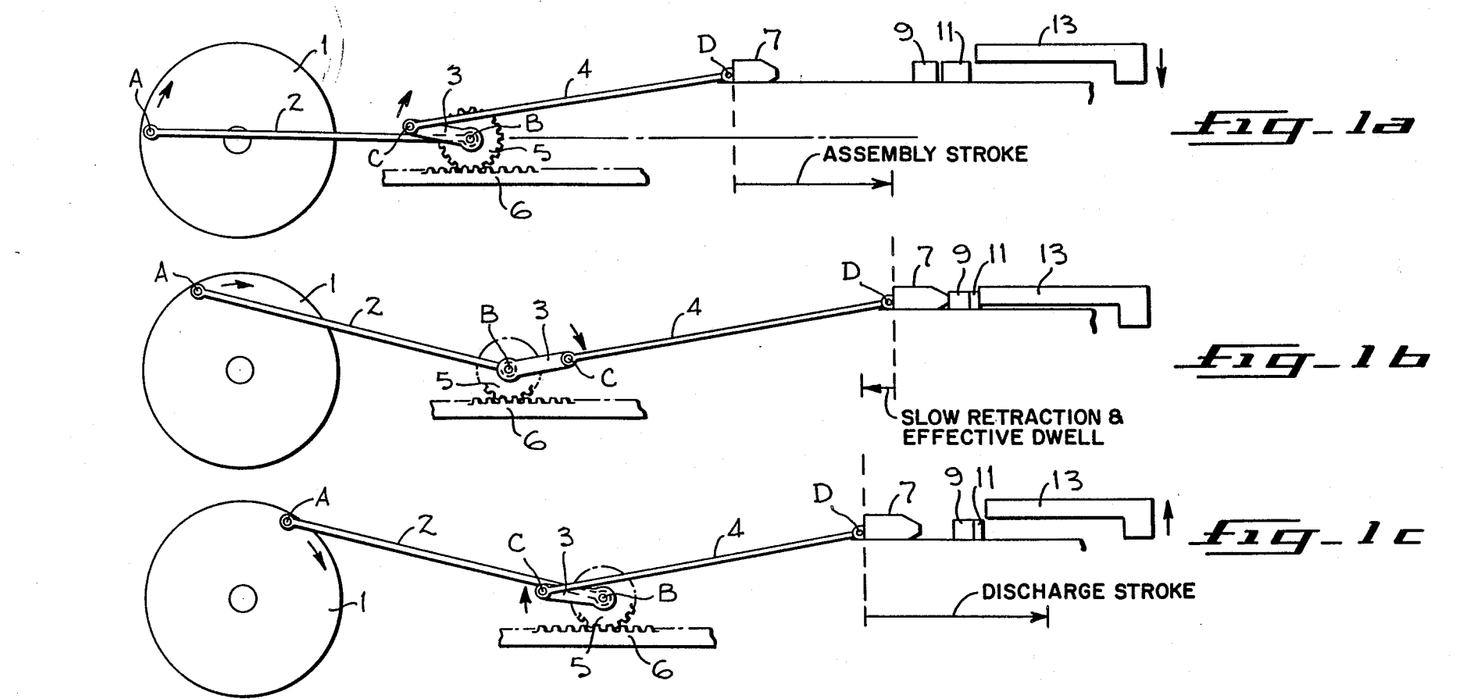
FIGS. 1a-d show simplified conceptual line drawings of the ram operation of the present invention.
Figure 1D:
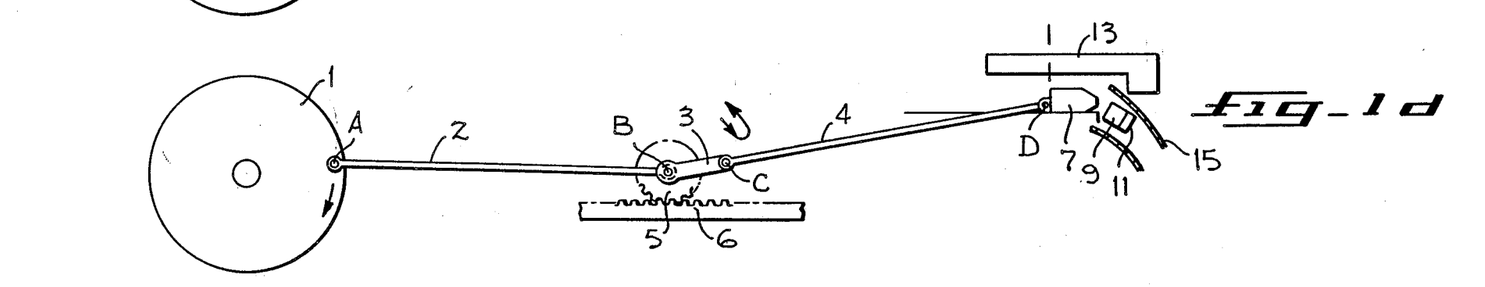

Note that the pivot point C on the outer end of arm 3 is situated outside the pitch circle of pinion gear 5. FIG. 1a shows the starting position of the assembly stroke with unassembled parts 9 and 11 in place between ram 7 and buck 13, with buck 13 shown being lowered into its parts back stop or assembly position.

Additionally, no driving mechanism is shown for causing flywheel 1 to rotate. That can be accomplished in several different ways and is not critical to the invention. For example, this could be accomplished with a gear motor with the teeth of its shaft meshing with teeth on an outer surface of the rim of flywheel 1.

As flywheel 1 moves through 1/6 rotation (FIG. 1b), pinion gear 5 moves along the rack 6 making $\frac{1}{2}$ revolution. As pinion gear 5 rotates, arm 3 swings through $\frac{1}{2}$ revolution with arm 3 moving over the top of the pinion gear 5 resulting in the forward motion of pinion gear 5 and arm 3 being additive. Thus ram 7 advances a distance equal to approximately the sum of the distance travelled by pinion gear 5 and twice the length of arm 3. If pivot point C in FIG. 1a were in line with the central axis of each of flywheel 1 and pinion gear 5, and ram 7 were on the horizontal plane that also includes the central axis of each of flywheel 1 and pinion gear 5, then the distance travelled by ram 7 would be equal to that sum. This gives the assembly stroke of ram 7 during which parts 9 and 11 are compressed together between ram 7 and buck 13.

On the second 1/6 rotation of the flywheel 1 (FIG. 1c), pinion gear 5 moves forward another ½ revolution with arm 3 swinging under pinion gear 5 and point C moves rearward relative to the center of pinion gear 5. An arm 3 begins to swing down, there is initially a lag in the rearward motion of point C since pinion gear 5 is moving forward faster than point C is moving backward relative to the axis of pinion gear 5, thus creating an an initial phase of continued net forward motion of ram 7 which carries through the completion of the assembly stroke. During the remainder of the second half revolution of pinion gear 5 (second 1/6 revolution of flywheel 1), arm 3 swings farther rearward advancing pivot point C to the rear faster than pinion gear 5 advances forward, thus producing a slow rearward partial retraction of ram 7 through a limited stroke. Also during this phase of operation, buck 13 is raised.

On the third 1/6 rotation of flywheel 1 (FIG. 1d), pinion gear 5 moves forward an additional ½ revolution, arm 3 swings over the top again, and the motions of arm 3 and pinion gear 5 are again additive, moving ram 7 forward to its farthest forward travel to provide the discharge stroke, thus discharging assembled parts 9 and 11 into chute 15. To this point, pinion gear 5 has travelled a distance equal to the diameter of flywheel 1.

Flywheel 1 then continues its clockwise rotation through the remaining half revolution to its starting point, and the ram undergoes a series of reverse mirror image motions as it returns to its starting position as shown in FIG. 1a.

Figure 12:
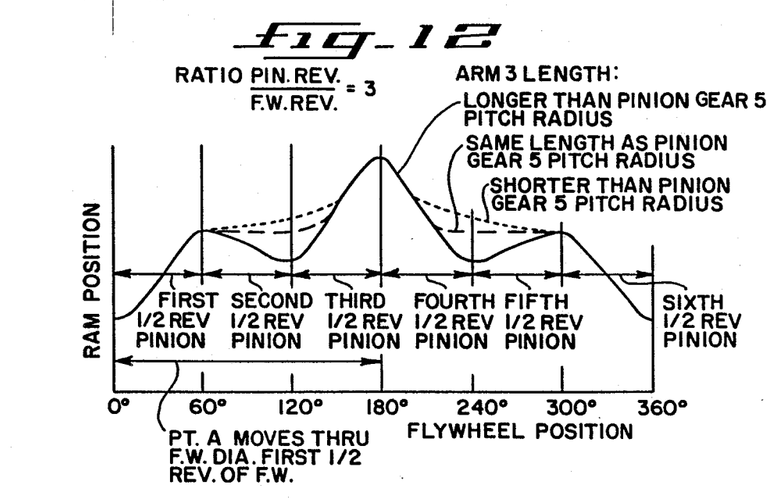
FIG. 12 is a graph of the ram position as a function of the flywheel position for a ratio of 3 revolutions of the pinion gear in half revolution steps to one revolution of the flywheel disregarding the effect of the included angles of the components of the apparatus and showing the effect of the length of arm 3 being longer than, the same length as, and shorter than, the radius of the pinion gear.
Figure 13:
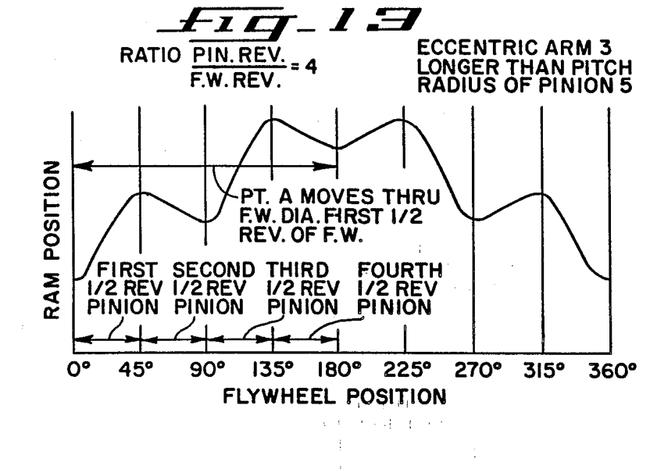
FIG. 13 is a graph of the ram position as a function of the flywheel position for a ratio of 4 revolutions of the pinion gear in half revolution steps to one revolution of the flywheel disregarding the effect of the included angles of the components of the apparatus.
Figure 14:
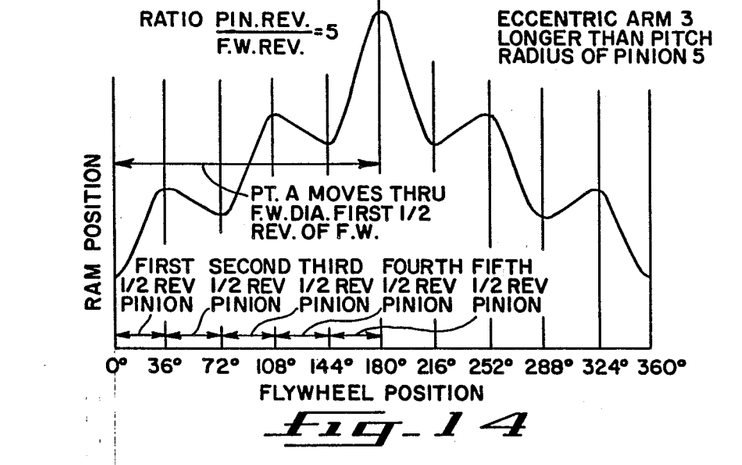
FIG. 14 is a graph of the ram position as a function of the flywheel position for a ratio of 5 revolutions of the pinion gear in half revolution steps to one revolution of the flywheel disregarding the effect of the included angles of the components of the apparatus.

Referring next to FIG. 12 the movement of ram 7 is shown graphically as a function of the position of flywheel 1 in the ideal case (lengths and diameters of the component parts not being taken into consideration) when the ratio of the number of revolutions of pinion gear 5 in half revolution steps to the number of revolutions of flywheel 1 is 3. The solid line curve shows the operation when the length of arm 3 is greater than the pitch radius of pinion gear 5. When the length of arm 3 is the same as or shorter than the pitch radius of pinion gear 5, the action of ram 7 when flywheel 1 is in the vicinity of 120° and 240° is modified as shown by the dashed and dotted curves, respectively.

Thus, when the length of arm 3 is the same as the pitch radius of pinion gear 5, ram 7 remains relatively stationary through the second half revolution of pinion gear 5, and then proceeds forward again during the third half revolution of pinion gear 5. For the condition where the length of arm 3 is less than the pitch radius of pinion gear 5, ram 7 proceeds forward slower during the second half revolution of pinion gear 5 than it does during the first and third half revolutions of pinion gear 5. For each condition, the movement of ram 7 during the second 180° of rotation of flywheel 1 is a reverse mirror image of its movement during the first 180° of rotation of flywheel 1.

For purposes of discussion, the angles of FIGS. 2a-g, 3 and 4 were calculated using the following dimensions for the various parts as shown in the line figures:

| flywheel 1 | 30 inch diameter |
|---|---|
| pinion gear 5 | 6.37 inch diameter |
| | (20 inch circumference) |
| eccentric arm 3 | 6 inch length |
| connecting rod 2 | 55 inch length |

-continued

| connecting rod 4 | ·55 inch length |
|---|---|

Additionally, connecting rods 2 and 4 are shown in FIGS. 2a-g with a dog leg at each of their respective ends that are connected to the pinion gear 5 and arm 3, respectively. The dimensions given above for rods 2 and 4 are for rods without the dog legs. The dog legs are included in these figures only to make the position of arm 3 in each of the views of FIGS. 2a-g clear. In each of these figures ram 7 is also shown on a horizontal plane which includes the central axes of flywheel 1 and pinion gear 5. Further, the views shown in FIGS. 2a-g have been selected since they show, in sequence, the furthest forward or rearward travel of ram 7 and the position of point A on the outer circumference of flywheel 1 with respect to its starting position for each of the positions of ram 7 during the operation of the device of the present invention.

Figure 2A:
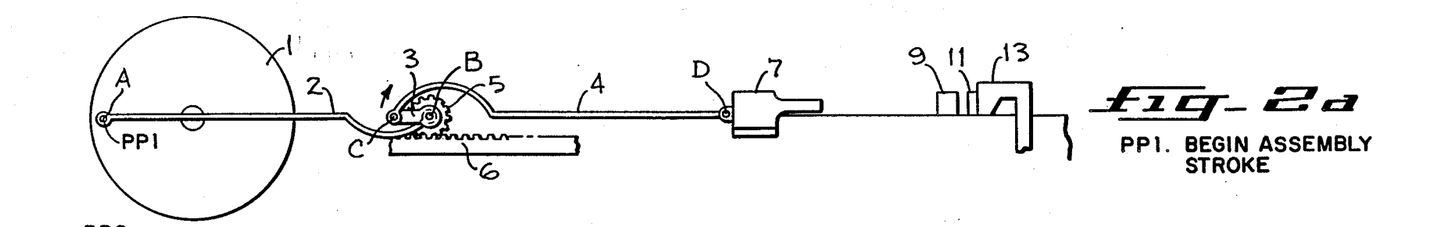
FIGS. 2a-g show simplified line drawings of the ram operation of the present invention taking representative actual dimensions into consideration.
Figure 2B:
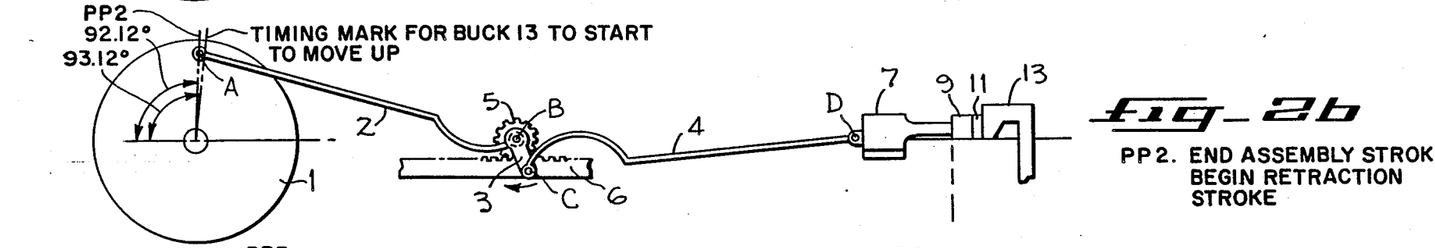

In FIG. 2a the device is in its beginning assembly stroke position. Point A is at its 0° reference position (PP1), arm 3 is horizontal and extending to the left, and pinion gear 5 and ram 7 are in their left-most positions. Also in this view, buck 13 is down and the location for the parts to be assembled is between ram 7 and buck 13. As flywheel 1 is rotated clockwise, pinion gear 5 rotates clockwise and advances to the right, which in turn advances ram 7 to the right.

Ram 7 reaches the end of its assembly stroke (FIG. 2b) when point A traverses 92.12°; the central axis of pinion gear 5 has traveled 13.47" to the right; and arm 3 has swung over the top of pinion gear 5 having passed horizontal to the right thereof and begun to return to the left. When point A on flywheel 1 reaches the timing mark of 93.12°, buck 13 begins to rise.

Figure 2C:
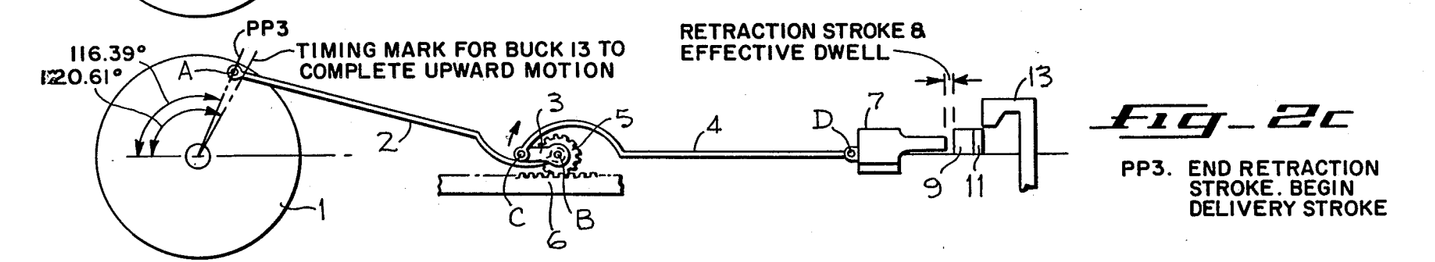

During the next phase of operation, ram 7 is slowly partially retracted toward its left-most starting position and is shown in FIG. 2c as being at the full extent of that partially retracted position. At this point in the operation pinion gear 5 is continuing to rotate clockwise, point A has traversed to PP3, 116.39° from its reference position, arm 3 is again horizontal and extends to the left, connecting rod 4 is horizontal, and as point A on flywheel 1 reaches the timing mark at 120.61° buck 13 is fully raised.

Figure 2D:
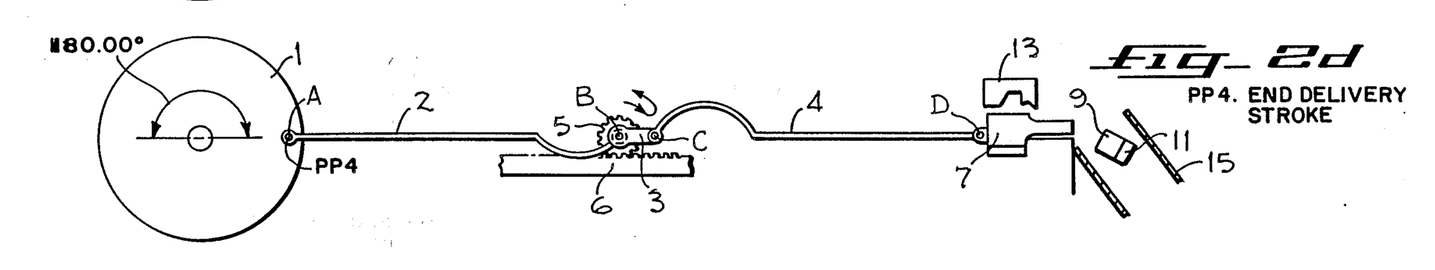

FIG. 2d shows point A having rotated clockwise to PP4 which is 180° from its reference or starting position. In this view connecting rods 2 and 4 are horizontal, the central axis of pinion gear 5 has traversed 30 inches along rack 6 to its right-most position, arm 3 is horizontal and extending to the right, and ram 7 is in its discharge position at the furthest extent of its travel to the right of any point in the operation of the device. Here, ram 7 passes beneath raised buck 13 to deliver the assembled parts 9 and 11 into chute 15. It can be seen that the difference in positions of ram 7 from that of FIG. 2a to FIG. 2d is the sum of the total travel of the central axis of pinion gear 5 (the diameter of flywheel 1) and twice the length of arm 3.

As flywheel 1 rotates through the second 180° of its single revolution, the component parts of the device go through a reverse mirror image series of moves as those of the first 180° of rotation of flywheel 1 with pinion gear 5 rotating counterclockwise.

Figures 2E, 2F:
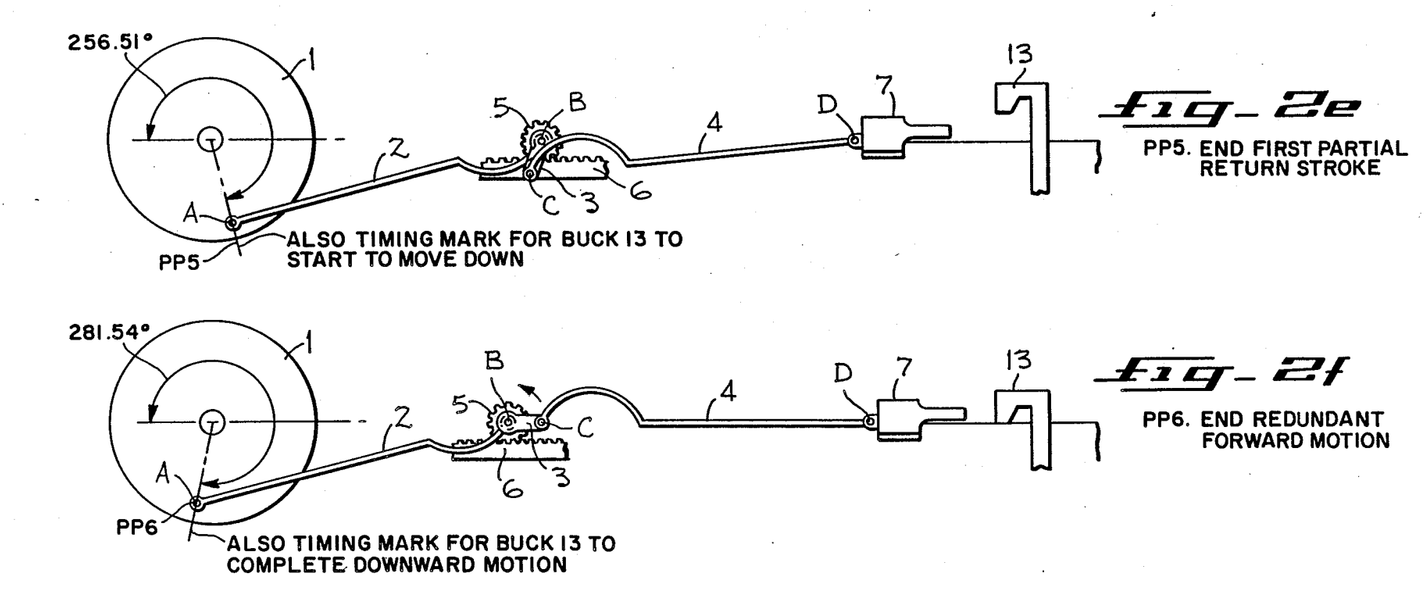
Figure 2G:
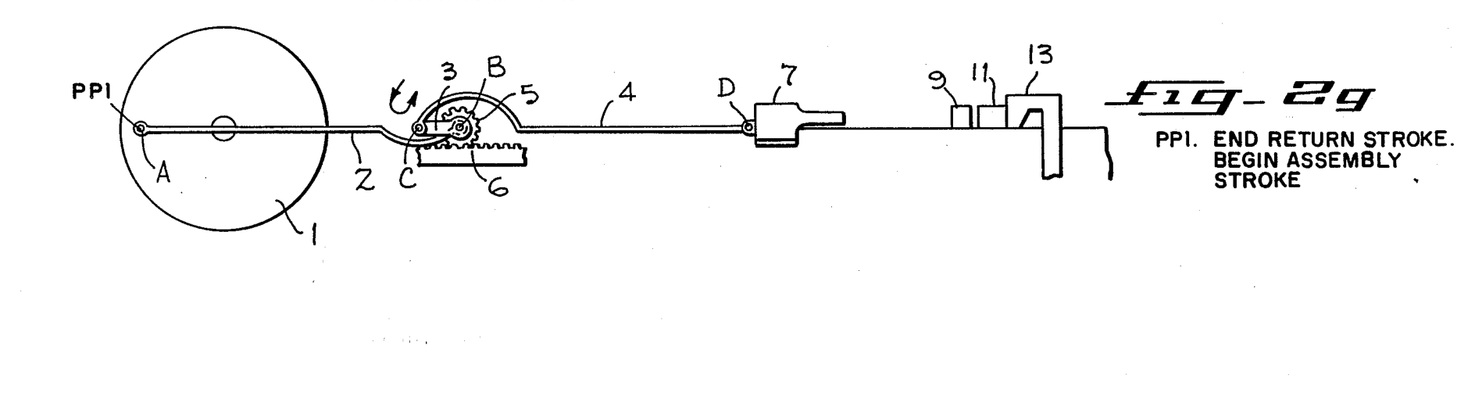

FIG. 2e shows point A of flywheel 1 having rotated through 256.51° to PP5 where ram 7 is at the full extent of its first partial return stroke and buck 13 begins to be lowered. In FIG. 2f, point A has rotated through 281.54° to PP6 with ram 7 having completed its redundant forward motion and buck 13 has been fully lowered. Then as point A completes its full rotation through 360° to return to PP1, ram 7 returns to the starting position as shown in FIGS. 2g and 2a.

Figure 3:
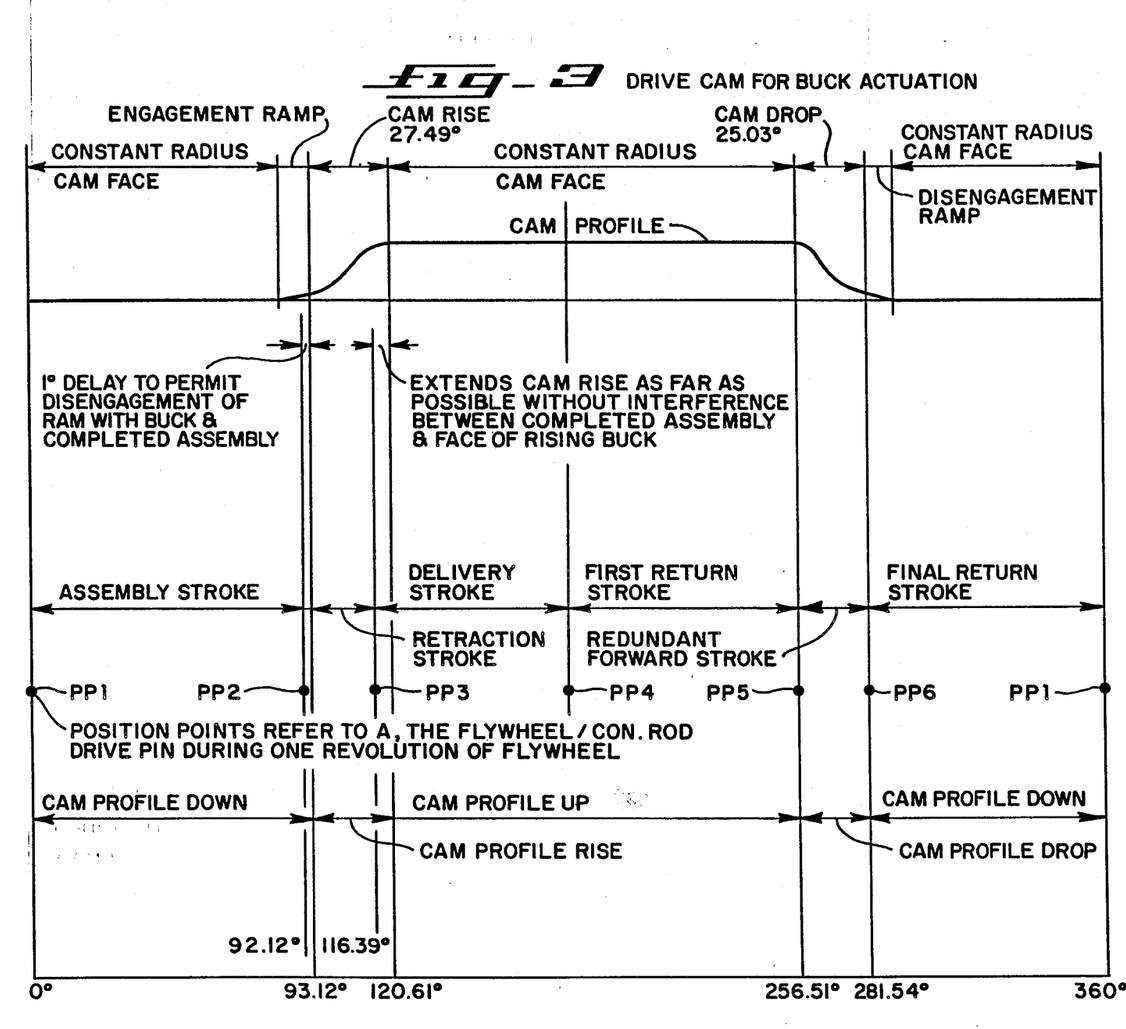
FIG. 3 is an unwrapped developed view of a cam mounted on the axis of the flywheel to drive a buck up and down during the cycling of the assembly device of the present invention for the specific example of FIGS. 2a-g.
Figure 4:
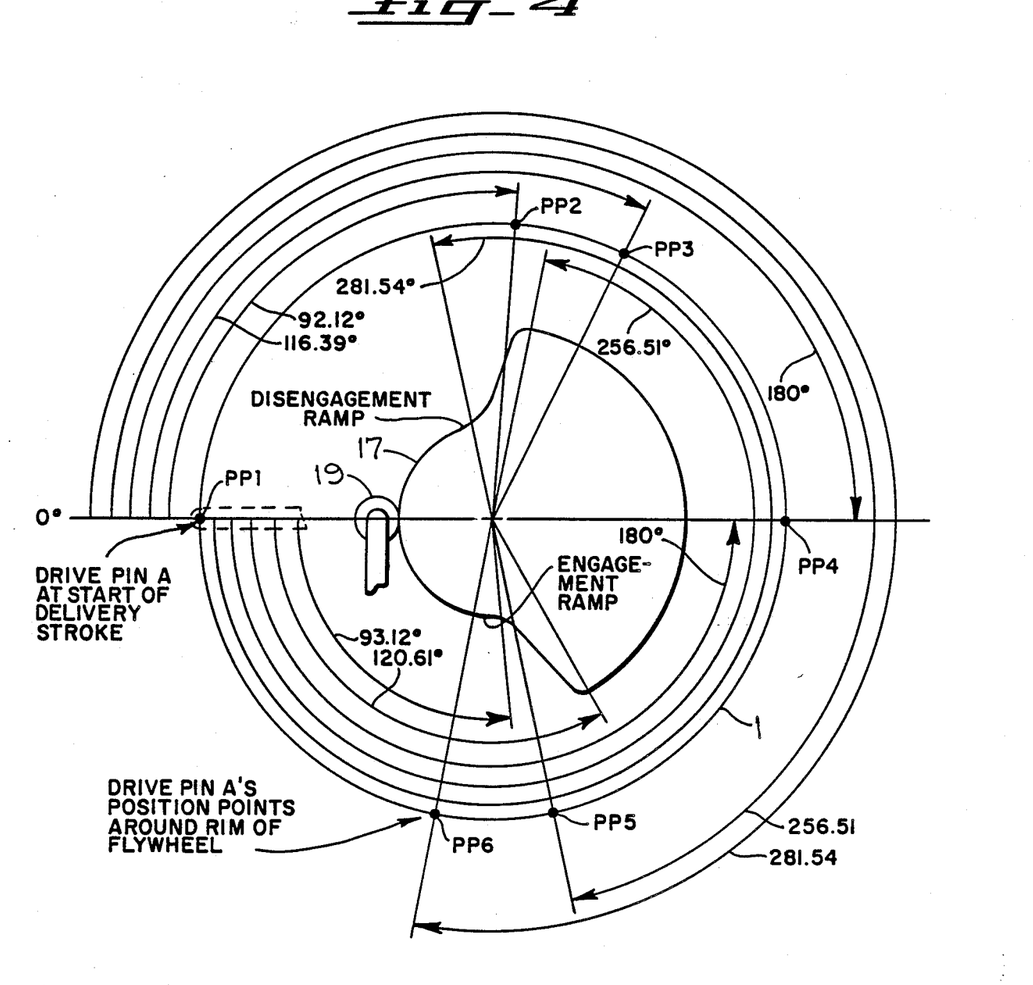
FIG. 4 shows an elevation view of the cam, cam follower and flywheel and their orientation, one to the other, for the specific example of FIGS. 2a-g.

Referring next to FIG. 3 there is shown an unwrapped developed view of a cam 17 that is mounted on the axis of flywheel 1 to drive buck 13 up and down during the cycling of the assembly device of the present invention. FIG. 4 shows a side elevation view of flywheel 1, cam 17 and stationary cam follower 19.

In FIG. 3 the cam profile features are shown along the top most portion. In the balance of the figure, PPs 1-6, as well as, how the functional steps of the device of the present invention (as discussed in FIGS. 2a-g) relate to the shape of the cam face are illustrated. Cam 17 is oriented in the position shown in these figures with cam follower 19 located on the same radial line of flywheel 1 as PP1. By doing so, the relationship of the profile of cam 17 relates directly to the position points (PP) of point A on flywheel 1. This was done to facilitate the visualization of the correspondence between the functional steps of the device operation and the raising and lowering of buck 13. Such an orientation does not necessarily result in the simplest linkage between cam follower 19 and buck 13. It should also be noted that other orientations of cam 17 and cam follower 19 with respect to flywheel 1 are possible and the actual orientation thereof is not critical to the operation of, or the inventive concepts of the present invention.

To isolate buck 13 in its full-down position from any vibration communicated thereto by flywheel 1 and cam 17, a clearance is provided between cam follower 19 and cam 17. This requires the inclusion of the short engagement and disengagement ramps at the beginning and end of the riser portions of cam 17 as shown in FIGS. 3 and 4.

Figure 5:
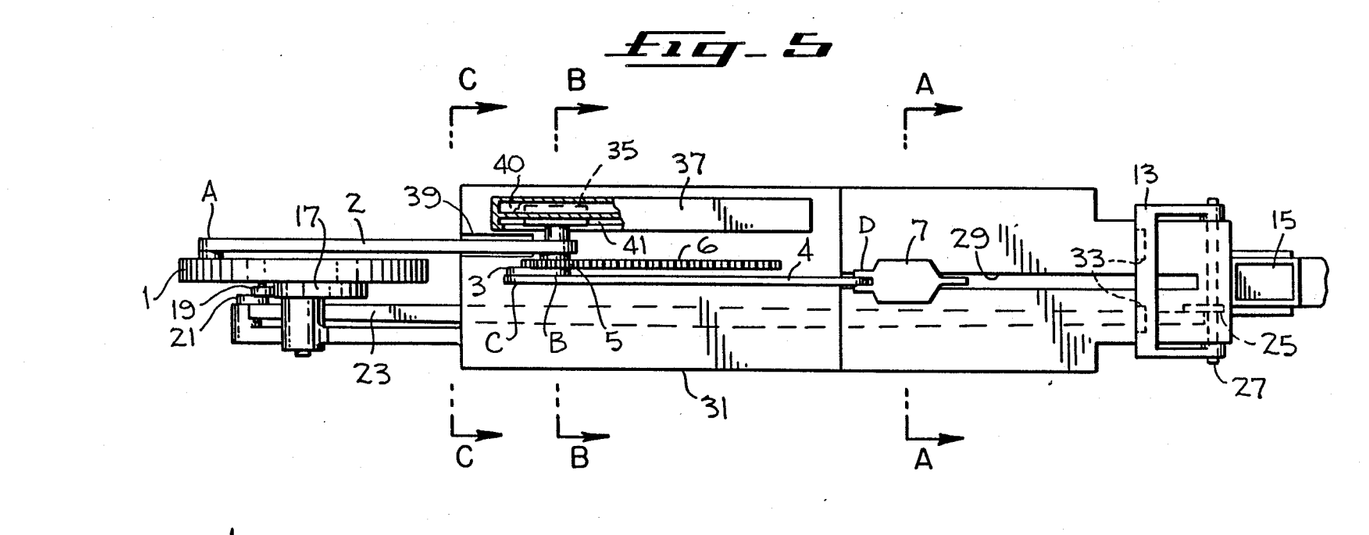
FIG. 5 is a top plan view of an implementation of the present invention.
Figure 6:
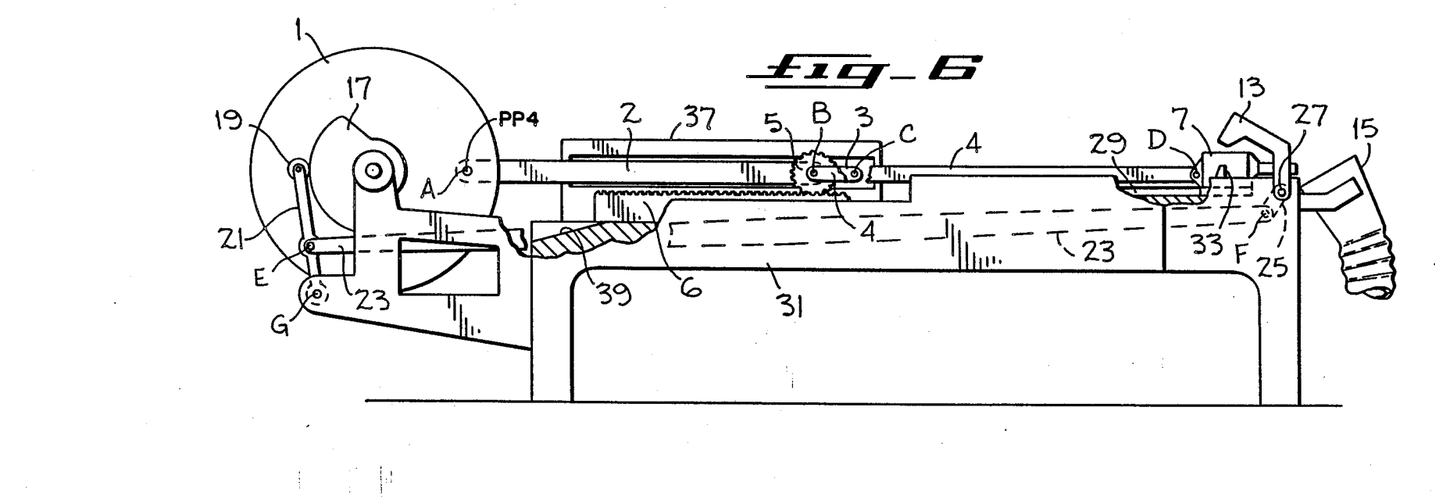
FIG. 6 is a front elevation view of an implementation of the present invention.
Figure 7:
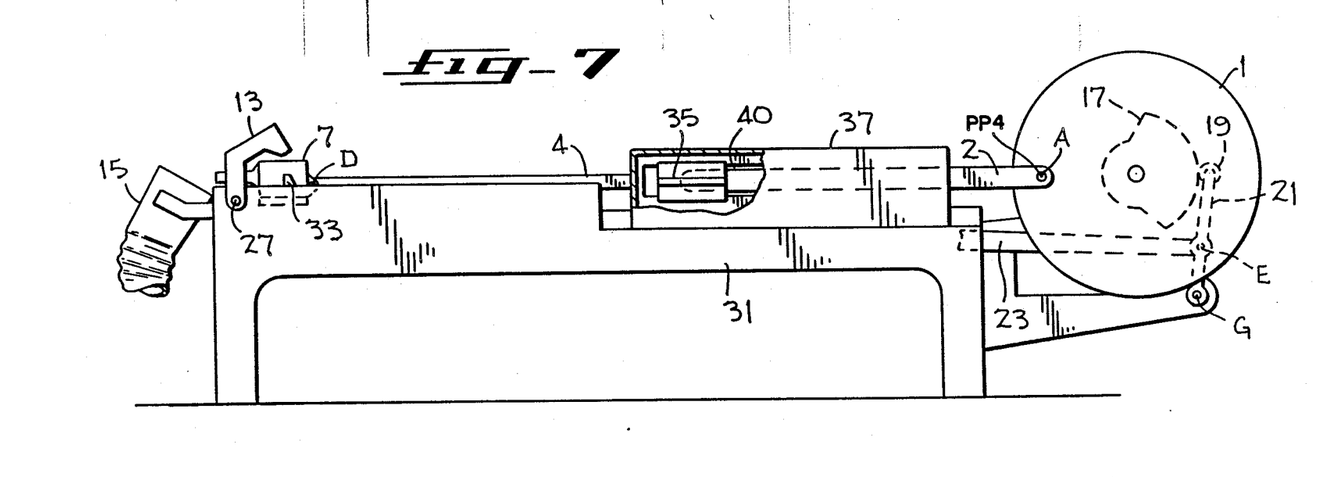
FIG. 7 is a back elevation view of an implementation of the present invention.
Figure 8:
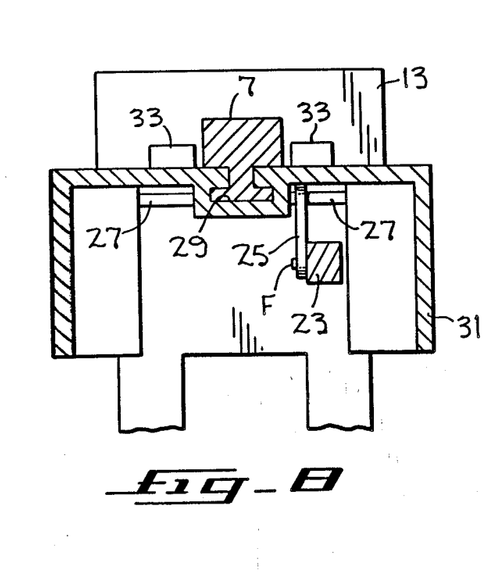
FIG. 8 is a cross-sectional view taken along line A—A in FIG. 5.
Figure 9:
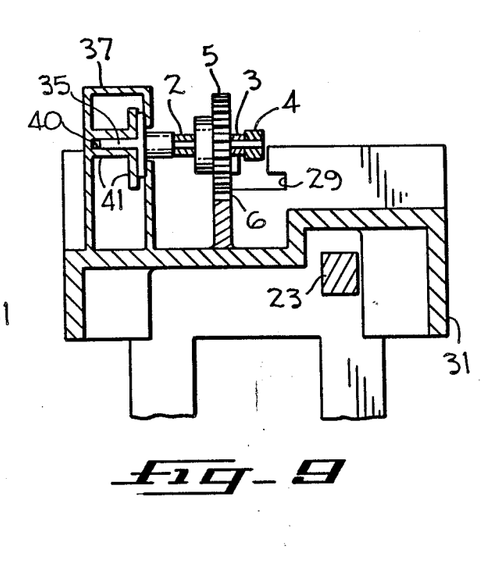
FIG. 9 is a cross-sectional view taken along line B—B in FIG. 5.
Figure 10:
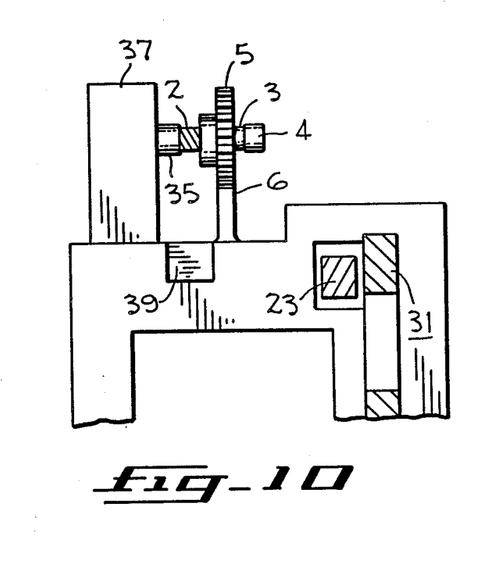
FIG. 10 is a cross-sectional view taken along line C—C in FIG. 5.
Figure 11:
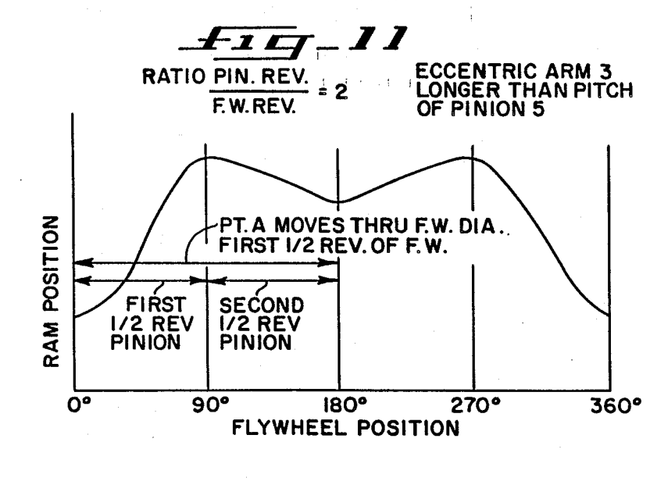
FIG. 11 is a graph of the ram position as a function of the flywheel position for a ratio of 2 revolutions of the pinion gear in half revolution steps to one revolution of the flywheel disregarding the effect of the included angles of the components of the apparatus.

FIGS. 5-10 show a collection of views of a specific implementation of the present invention. FIGS. 5, 6 and 7 are top, front and back views, respectively, and FIGS. 8-10 show cross-sections of the embodiment of the other figures taken along lines A—A, B—B and C—C (FIG. 5), respectively.

In FIGS. 5-7, flywheel 1, rotatably mounted to frame 31, is shown having affixed concentrically to the front side thereof a cam 17, and at point A on the back side near the outer edge of flywheel 1 one end of connecting rod 2 is rotatably attached. A shaft through the central axis of pinion gear 5 is journaled through the other end of connecting rod 2 (point B). As flywheel 1 rotates, connecting rod 2 pushes or pulls pinion gear 5 along toothed rack 6 which is affixed to frame 31 causing pinion gear 5 to rotate about its central axis. One end of arm 3 is rigidly attached to the front side of pinion gear 5 with the other end of arm 3 (point C) extending beyond the outer circumference of pinion gear 5. In turn, the other end of arm 3 is rotatably attached to one end of connecting rod 4. The other end of connecting rod 4 (point D) is rotatably connected to ram 7 to provide motion thereto. In these figures ram 7 runs along a plane that is co-incident with the horizontal plane which also contains the central axis of flywheel 1 and pinion gear 5.

To support pinion gear 5 in the vertical position there is a sliding shoe 35 affixed to the other end of the central shaft of pinion gear 5 after it extends through the end of connecting rod 2. Shoe 35 slides along surfaces 41 within a clearance slot 40 that is within housing 37 attached to frame 31. Cut-out 39 provides clearance for the action of connecting rod 2 in the vicinity of table 31.

Cam follower 19 is mounted on one end of cam follower arm 21 along the radial of flywheel 1 that extends to PP1. The other end of cam follower arm 21 is rotatably mounted to frame 31 beneath cam follower 19 at point G. At point E along cam follower arm 21, intermediate its two ends, one end of connecting rod 23 is rotatably attached. The other end of connecting rod 23 is rotatably attached to one end of buck activator arm 25 (point F), and the other end of buck activator arm 25 is rigidly attached to buck 13 on cross shaft 27. Thus, as cam follower 19 follows the surface of cam 17, cam follower arm 21 rocks back and forth causing connecting rod 23 to move forward and backward, respectively. As connecting rod 23 moves forward, point F is pushed farther from the flywheel 1 end of frame 31 resulting in the lowering of buck 13 to the plane on which ram 7 is mounted. Similarly, as connecting rod 23 moves backward, point F is pulled toward the flywheel 1 end of frame 31 resulting in the raising of buck 13 from the plane on which ram 7 is mounted. Also shown in these figures is discharge chute 15 at the end of frame 31 farthest from flywheel 1. Upward extending stops 33 are provided from frame 31 behind buck 13 to back it up when it is in the down position as force is applied by ram 7 as it is advanced forward. Stops 33 are placed one on either side of slot 29 to allow for the passage of ram 7 therebetween in the discharge phase of the operation of the device of the present invention.

FIG. 8 is a cross-section taken along line A—A of FIG. 5. In this view, buck 13 is shown in its down position, and ram 7 is shown slidably captured in a T-shaped slot 29. T-shaped slot 29 runs the full length of the travel of ram 7 and is provided to guide the movement of ram 7 in a straight line and to maintain ram 7 in an upright orientation.

Referring next to FIG. 9 there is shown a cross-sectional view taken along line B—B of FIG. 5. This view is provided to show the details of the mounting of pinion gear 5 discussed above in relation to FIGS. 5-7. To simplify this view ram 7 and buck 13 and associated linkages have been omitted.

Similarly, FIG. 10 is a cross-sectional view taken along line C—C of FIG. 5. This figure is also included to better show the details of the mounting of pinion gear 5 with the view taken farther to the left so as to not cross-section the region in which pinion gear 5 is mounted. As in FIG. 9, ram 7 and the details of buck 13 and its linkage have been omitted for simplicity.

The above discussion has dealt with an assembly apparatus that has an integer ratio of 3 as the ratio between the number of revolutions of pinion gear 5 in half revolution steps to the number of revolutions of flywheel 1. Since this ratio is also the number of half revolutions of pinion gear 5 for one half revolution of flywheel 1 and the central axis (point B) of pinion gear 5 traverses a distance equal to the diameter of flywheel 1 in one half revolution of flywheel 1, the pitch circumference of pinion gear 5 can be stated as a function of the diameter of flywheel 1 as shown in Table I. This generalized relationship is $(2D)/N$ where D is the diameter of flywheel 1 and N the ratio of revolutions between pinion gear 5 and flywheel 1. The present invention also includes any integer ratio of those elements that is 2 or greater. The operation of the apparatus is similar for any integer ratio with only a difference in the position of ram 7 when compared to the angular position of flywheel 1. FIGS. 11 through 15, disregarding the effect of the included angles of the components of the apparatus, show the position of ram 7 as a function of the angular position of flywheel 1 for ratios of 2, 3, 4 and 5, respectively. By comparing these graphs one can easily predict the effect of even higher ratios. Note that in each curve the number of peaks and intermediate peaks is equal to the integer ratio, that for odd integer ratios the maximum peaks occur when flywheel 1 is in its 180° position, and that there is a pair of maximum peaks on either side of the 180° position when the ratio is even.

From the foregoing description, it will be apparent that the invention disclosed herein provides a novel and advantageous multiple-step cyclical ram assembly device. As will be understood by those familiar with the art, the invention may be embodied in other specific forms without departing from the spirit or essential characteristics thereof. The scope of the invention is to be limited only by the scope of the claims which follow.

TABLE I

| Pinion Rev Flywheel Rev | Pitch Circumference (C) of Pinion 5 as Function of the Diameter of Flywheel 1 (D) | C for D = 30 |
|---|---|---|
| 2 | D | 30 |
| 3 | $\frac{2D}{3}$ | 20 |
| 4 | $\frac{D}{2}$ | 15 |
| 5 | $\frac{2D}{5}$ | 12 |
| . | | |
| . | | |
| . | | |
| n | $\frac{2D}{n}$ | $\frac{60}{n}$ |

What is claimed is:

1. Apparatus for cyclically advancing and retracting a ram in multiple steps, said apparatus comprises:
   a flywheel rotatably mounted on its central axis;
   a first connecting rod having one end rotatably connected to said flywheel a selected distance, D, from the central axis of said flywheel;
   a toothed rack mounted in a fixed position;
   a pinion gear having teeth therearound mating with the teeth of said toothed rack, a second end of said first connecting rod rotatably connected to the central axis of the pinion gear for imparting reciprocating motion to the pinion gear along the toothed rack as said flywheel is rotated, the pinion gear having a pitch circumference, C, equal to (2D)/N wherein N is the ratio of revolutions of said pinion gear in half revolution steps to the revolutions of said flywheel with N having an integer value of at least 2;
   an arm having one end affixed to the central axis of said pinion gear;
   a second connecting rod having one end rotatably connected to a second end of said arm with a second end of the second connecting rod extending away from said flywheel; and
   a ram slidably mounted on a fixed surface with the second end of said second connecting rod rotatably connected to the ram.

2. Apparatus as in claim 1 wherein the length of said arm is greater in length than a pitch radius of said pinion gear so that during a first 180° of revolution of said flywheel, odd number half rotations of said pinion gear result in substantial advancement of said ram and even number half rotations of said pinion gear result in substantial retraction of said ram, and during a second 180° of revolution of said flywheel, said advancement and retraction with respect to said odd number half rotations and even number half rotations are reversed in direction and interchanged with respect to the odd number and even number half rotations.

3. Apparatus as in claim 1 wherein said arm is equal in length to a pitch radius of said pinion gear so that during a first 180° of revolution of said flywheel, odd number half rotations of said pinion gear result in substantial advancement of said ram and even number half rotations of said pinion gear result in said ram remaining substantially stationary, and during a second 180° of revolution of said flywheel, said advancement and substantially stationary period with respect to said odd number half rotations and even number half rotations are reversed in direction and interchanged with respect to the odd number and even number half rotations.

4. Apparatus as in claim 1 wherein said arm is less in length than a pitch radius of said pinion gear so that during a first 180° of revolution of said flywheel, odd number half rotations of said pinion gear result in substantial advancement of said ram at a first rate and even number half rotations of said pinion gear result in substantial advancement of said ram at a second rate wherein the second rate is slower than the first rate, and during a second 180° of revolution of said flywheel, said advancement at said first rate and said advancement at said second rate with respect to said odd number half rotations and even number half rotations are reversed in direction and interchanged with respect to the odd number and even number half rotations.

5. Apparatus as in claim 1 further includes buck means located on a side of said ram furthest from said flywheel for providing a stop against which said ram can compress selected items between the opposed faces of said ram and said buck means.

6. Apparatus as in claim 5 further includes operational means for raising and lowering said buck means as a function of position of said ram.

7. Apparatus as in claim 6 wherein said operational means includes:
   linkage means connected to said buck means for raising and lowering said buck means; and
   cam means affixed to said flywheel and coupled to said linkage means for synchronizing activation of the linkage means with the flywheel and thereby the position of said ram.

8. Apparatus as in claim 6 wherein N equals 3 and the length of said arm is greater than the radius of said pinion gear, said buck means being raised during a second half revolution of said pinion gear and lowered during a fifth half revolution of said pinion gear.

* * * * *